(12) United States Patent
Eldredge et al.

(10) Patent No.: US 6,546,665 B1
(45) Date of Patent: Apr. 15, 2003

(54) ILLUMINATED FISHING ROD HAVING A VERSATILE LIGHT SOURCE

(76) Inventors: Mark Eldredge, 167 W. 1290 N., American Fork, UT (US) 84003-2729; Rick Herbert, 333 W. 300 N., Lehi, UT (US) 84043

( * ) Notice: Subject to any disclaimer, the term of this patent is extended or adjusted under 35 U.S.C. 154(b) by 0 days.

(21) Appl. No.: 10/057,874

(22) Filed: Jan. 29, 2002

(51) Int. Cl.[7] ............................................. A01K 87/00
(52) U.S. Cl. ...................................................... 43/17.5
(58) Field of Search ........................ 43/17.5; 362/109, 362/119

(56) References Cited

U.S. PATENT DOCUMENTS

| | | | | |
|---|---|---|---|---|
| 2,791,676 A | * | 5/1957 | Cote | ........................... 43/17.5 |
| 4,026,059 A | | 5/1977 | Ochs | |
| 4,085,437 A | | 4/1978 | Hrdlicka et al. | |
| 4,117,618 A | * | 10/1978 | Utsler | ........................ 43/17.5 |
| 4,750,287 A | | 6/1988 | Myers | |
| 4,775,920 A | * | 10/1988 | Seibert | ........................ 362/109 |
| 5,172,508 A | * | 12/1992 | Schmidt | ...................... 43/18.1 |
| 5,182,873 A | * | 2/1993 | Aragon | ............................ 43/17 |
| 5,205,061 A | * | 4/1993 | Echols | ........................ 43/17.5 |
| 5,276,990 A | * | 1/1994 | Ramirez | ...................... 43/17.5 |
| 5,347,741 A | * | 9/1994 | Konrad | ........................ 43/17.5 |
| 5,357,410 A | * | 10/1994 | Cota | ........................... 362/109 |
| 5,566,493 A | * | 10/1996 | Minorics | ..................... 43/17.5 |
| 5,586,403 A | * | 12/1996 | Ward | ........................... 43/17.5 |
| 5,644,864 A | * | 7/1997 | Kelly | .......................... 43/17.5 |
| 6,061,946 A | * | 5/2000 | Toelken | ....................... 43/17.5 |

* cited by examiner

Primary Examiner—Kurt Rowan
(74) Attorney, Agent, or Firm—Donald R. Schoonover

(57) ABSTRACT

An illuminated fishing rod includes a light source unit removably received in a handle section of the fishing rod. The light source unit includes an LED light source that is located to illuminate a fiber optic bundle located in a blade section of the fishing rod when the light source unit is received in the handle section of the fishing rod. The light source unit can also be used as an auxiliary light source, such as a flashlight, when it is removed from the fishing rod.

3 Claims, 3 Drawing Sheets

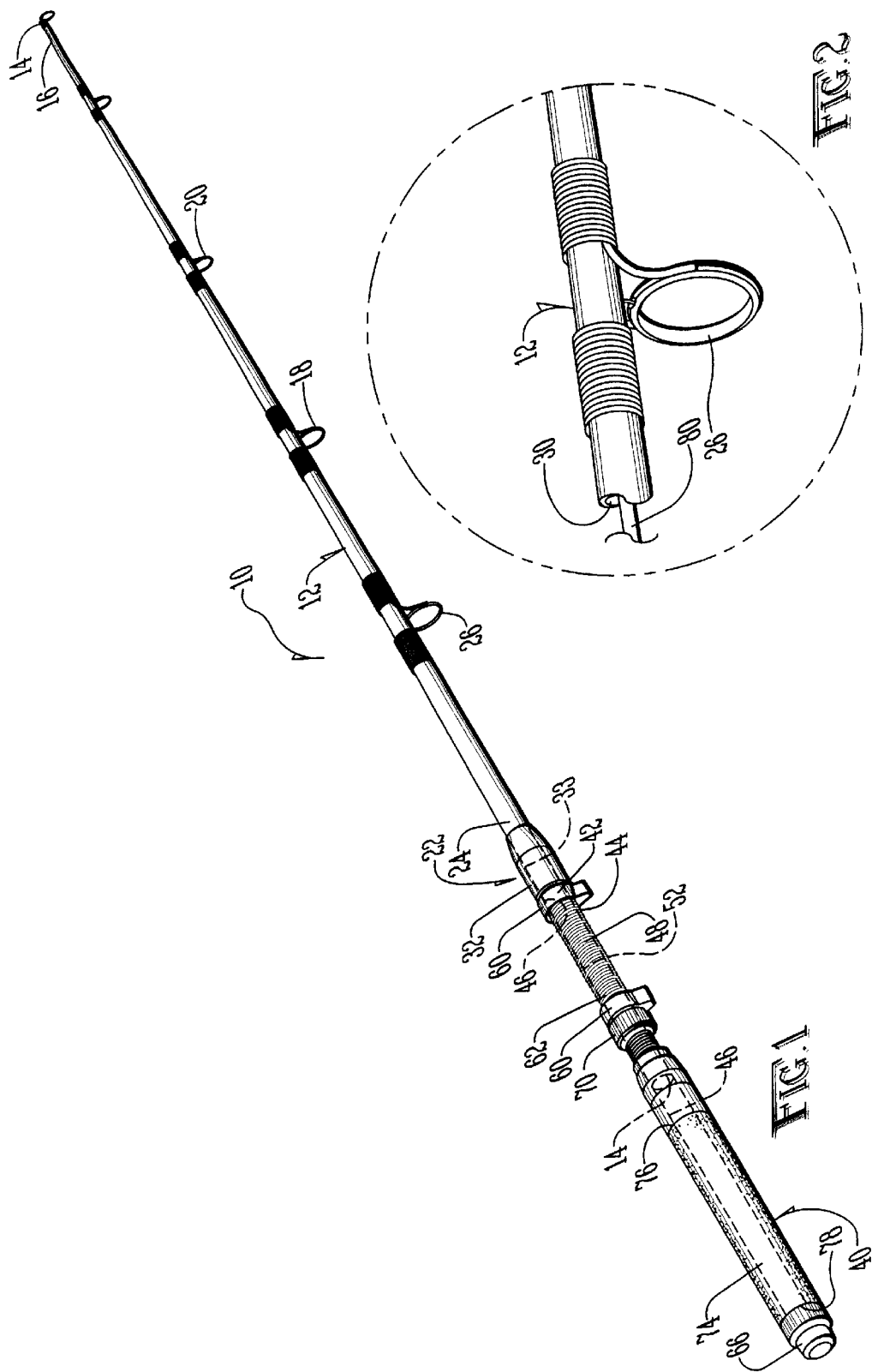

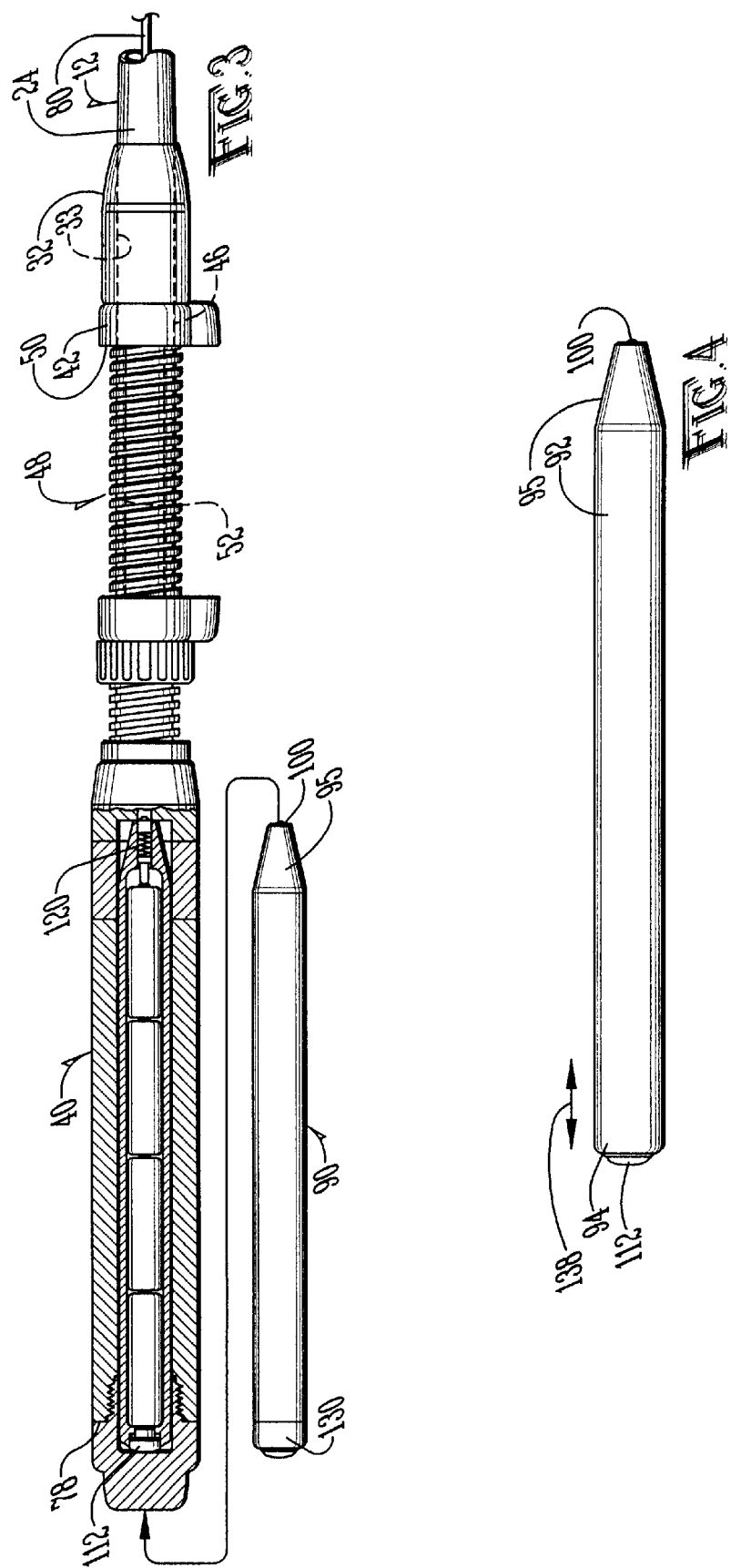

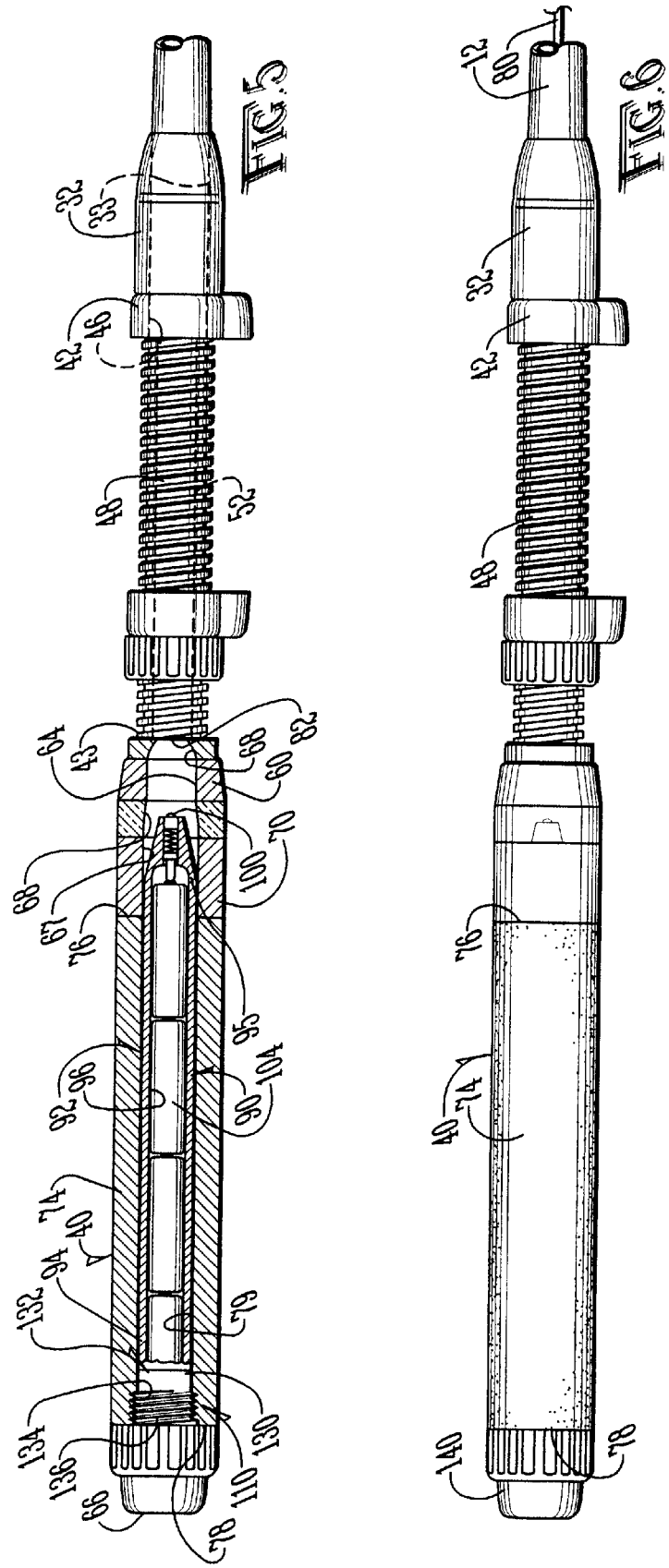

ILLUMINATED FISHING ROD HAVING A VERSATILE LIGHT SOURCE

BACKGROUND OF THE INVENTION

1. Field of the Invention

The present invention relates to the general art of fishing, and to the particular field of illuminated fishing rods.

2. Discussion of the Related Art

Night fishing is popular for many reasons, including the fact that certain fish are most active in their feeding at night thereby making it most likely that such fish can be more easily caught at night. However, night fishing presents several problems. For example, the poor lighting at night makes it difficult to see the fishing line. The line can thus become tangled at the reel or wrapped around the end of the rod because it is not seen.

Accordingly, the art contains many examples of devices which are intended to provide light for a fishing rod.

Another problem associated with night fishing is the difficulty of performing certain tasks such as changing a hook or a lure, removing tangles from the line, netting a fish or the like. These tasks are often carried out while the fisherman holds a light in one hand and tries to complete the task with the other hand or by supporting a light nearby.

However, the light used to carry out such hand tasks may, itself, create problems. For example, the light can be lost or forgotten, it may require special batteries or power sources, both of which may make the light expensive and difficult to use. Such lights can be left on, thus depleting the power source.

Therefore, there is a need for a light which can both light a fishing rod and be used to carry out other activities associated with night fishing.

There is a further need for a light which can both light a fishing rod and be used to carry out other activities associated with night fishing and which can conserve any power source associated therewith.

There is yet a further need for a light which can both light a fishing rod and be used to carry out other activities associated with night fishing and which is easily and conveniently stored.

There is yet a further need for a light which can both light a fishing rod and be used to carry out other activities associated with night fishing and which is easily operated in any of a plurality of modes.

PRINCIPAL OBJECTS OF THE INVENTION

It is a main object of the present invention to provide a light which can both light a fishing rod and be used to carry out other activities associated with night fishing.

It is another object of the present invention to provide a light which can both light a fishing rod and be used to carry out other activities associated with night fishing and which can conserve any power source associated therewith.

It is another object of the present invention to provide a light which can both light a fishing rod and be used to carry out other activities associated with night fishing and which is easily and conveniently stored.

It is another object of the present invention to provide a light which can both light a fishing rod and be used to carry out other activities associated with night fishing and which is easily operated in a plurality of modes.

SUMMARY OF THE INVENTION

These, and other, objects are achieved by an illuminated fishing rod in which a light source unit is removably received in a bore defined in a handle unit of the fishing rod and illuminates a fiber optic bundle in a blade section of the fishing rod when the light source unit is received in the handle unit and when activated, and can function as an auxiliary light source when removed from the handle unit. The light source unit has a double-acting switch which can temporarily connect a power source to a light source or can permanently connect the power source to the light source when desired. Temporary connection between the light source and the power source is used to light the light source unit when it is functioning as an auxiliary light source and permanent connection between the light source and the power source is used when the light source unit is functioning to illuminate the fishing rod via the fiber optic bundle. The light source unit is stored in the fishing rod so it is not likely to be lost. The internal portion of the fishing rod adjacent to the light emitting portion of the light source is reflective and is shaped to concentrate the light emitted by the light source onto the fiber optic bundle whereby light from the light source is used efficiently.

BRIEF DESCRIPTION OF THE DRAWINGS

FIG. 1 is a view of an illuminated fishing rod embodying the teaching of the present invention.

FIG. 2 is a fragmentary, detail view showing a fiber optic bundle in place in the illuminated fishing rod of the present invention.

FIG. 3 is a fragmentary, detail view showing a handle unit with a portion cutaway to reveal a light source unit removably received therein.

FIG. 4 shows the light source unit of the present invention.

FIG. 5 is an enlarged and fragmentary, detail view of the handle unit of the illuminated fishing rod of the present invention with a portion cutaway to reveal a light source unit removably received therein.

FIG. 6 is a fragmentary, elevational view of the illuminated fishing rod of the present invention.

DETAILED DESCRIPTION OF THE INVENTION

Other objects, features and advantages of the invention will become apparent from a consideration of the following detailed description and the accompanying drawings.

The illuminated fishing rod of the present invention includes a versatile light source unit that can function either to illuminate the fishing rod or as an auxiliary light source, such as a flashlight or the like, when desired.

Referring to FIGS. 1 and 2, an illuminated fishing rod 10 embodying the present invention is shown. Illuminated fishing rod 10 comprises a hollow blade section 12 having a tip 14 at a distal end 16 thereof, a plurality of line guides, such as line guides 18 and 20, mounted on blade section 12, a butt section 22 at a proximal end 24 of blade section 12. Fishing rod 10 further includes a butt guide 26 on butt section 22, of blade section 12. A bore 30 extends through blade section 12 from proximal end 24 of blade section 12 to tip 14 of blade section 12. A chuck 32 is located on proximal end 24 of blade section 12 and includes a bore 33 which is aligned with bore 30 in the blade section 12 when the chuck 32 is mounted on the blade section 12.

Fishing rod 10 further includes a handle section 40 which includes a foregrip 42 on a distal end 43 of handle section 40. Foregrip 42 engages chuck 32 on blade section 12 when the handle section 40 is coupled to the blade section 12 and includes a bore 46 defined therein to be aligned with bore 33 in chuck 32. Handle section 40 further includes a reel seat section 48 adjacent to a proximal end 50 of foregrip 42. Reel seat section 48 has a bore 52 defined therethrough which is aligned with bore 46 in foregrip 44. A rear hood/reel seat ring 60 is mounted on a proximal end 62 of reel seat section 48 of handle section 40 and which includes an internal bore 64 aligned with bore 30 extending through blade section 12 and through the chuck 32 and foregrip 44 whereby a continuous bore is defined between tip 14 of blade section 12 and a proximal end 66 of handle section 40.

As is best shown in FIG. 5, internal bore 64 of hood/reel seat ring 60 has an internal surface 67 which is reflective and is curved at locations 68 for a purpose that will be understood from the following disclosure. A lock ring 70 is located on rear hood/reel seat ring 60. A butt grip 74 is attached to handle section 40 adjacent to lock ring 70 with lock ring 70 being interposed between the butt grip 74 and the reel seat of handle section 40. Butt grip 74 of handle section 40 has a distal end 76 located adjacent to rear hood/reel seat ring 60 of the handle section 40 and further includes a proximal end 78. Butt grip 74 of the handle section 40 is hollow and has a bore 80 defined therethrough from the proximal end of the butt grip 74 to the distal end of the butt grip 74 and which is aligned with bore 30 defined through blade section 12. As can be understood from the above, a continuous bore is defined between tip 14 of blade section 12 and proximal end 66 of handle section 40.

As best shown in FIG. 6, illuminated fishing rod 10 includes a fiber optic bundle 80 located in bore 30 of blade section 12 and having a proximal end 82 located closely adjacent to distal end 44 of handle section 40 and a distal end 84 which is located closely adjacent to distal end 16 of blade section 12. The fiber optic bundle 80 thus extends through the aligned bores from adjacent to the handle section 40 to adjacent to the tip 14 of the blade section 12 to extend through essentially the entire fishing rod.

As is best shown in FIGS. 3–5, a light source unit 90 is removably received in bore 79 in butt grip 74 of handle section 40. As is shown, light source unit 90 includes a hollow body 92 having a proximal end 94 located adjacent to proximal end 66 of butt grip 74 of handle section 40 when light source unit 90 is received in bore 80 of butt grip 74 and a distal end 95 located adjacent to proximal end 82 of fiber optic bundle 80 when light source unit 90 is received in bore 79 of butt grip 74. Body 92 includes a hollow bore 96. Light source unit 90 includes an LED light source 100 on the distal end 95 of body 92 of light source unit 90 and positioned closely adjacent to proximal end 82 of fiber optic bundle 80 when light source unit 90 is received in bore 79 of butt grip 74. The LED light source 100 can conserve power while emitting sufficient light for the purposes of either lighting the fishing rod or acting as an auxiliary light. As indicated in FIG. 5, the internal surface 67 of the fishing rod located around the LED light source 100, when the light source 100 is positioned in the fishing rod, can be reflective to further concentrate the light emitted by the LED light source 100. Internal surface 67 is also curved to further concentrate the light emitted by the LED light source 100 onto the proximal end 82 of the fiber optic bundle 80. The curved and reflective properties of the internal surface 67 permits a low power LED to be used in order to conserve power of the power source while still permitting the light emitted by the LED light source to be sufficient to illuminate the fishing rod via the fiber optic bundle 80.

A power source 104, such as a plurality of batteries or the like, is located in hollow bore 96 in body 92 of light source unit 90.

Light source unit 90 further includes a double-acting switch 110 in body 92. Double acting switch 110 has an "ON" position electrically connecting the power source of the light source unit to the LED light source 100 of the light source unit and an "OFF" position electrically disconnecting the power source from the LED light source. The double-acting switch 110 is movably mounted on body 92 of the light source unit to move between the ON position and the OFF position and includes a push button element 112 on proximal end 94 of body 92 of light source unit 90 and is mounted on body 92 to move into the body of the light source unit toward distal end 95 of the body of the light source unit when pushed toward the distal end of the body of the light source unit to move the double-acting switch 110 to the ON position when push button 112 is pushed toward the distal end of the body of the light source unit. Light source unit 90 further includes a biasing element 120, such as a spring or the like, in body 92 of the light source unit 90 that biases push button 112 toward proximal end 94 of the body of the light source unit and outwardly of bore 96 to bias the double-acting switch 110 of light source unit 90 toward the OFF position. The light source unit 90 further includes a twist switch 130 having a cap 132 which includes internal threads 134 and external threads 136 located on the proximal end of the body of the light source unit with the internal threads and the external threads threadably engaged with each other to threadably mount cap 132 of twist switch 130 on the distal end of the body of the light source unit and moving the double-acting switch 110 of the light source unit into the ON position when cap 132 of the twist switch 130 is rotated in one direction and moving the double-acting switch 110 of the light source unit into the OFF position when the cap 132 of the twist switch 130 is rotated in an opposite direction as indicated by double-headed arrow 138 in FIG. 4.

The push button 112 and the threaded cap 132 move the power source forward toward the LED light source 100 to force the power source into electrical contact with the LED light source to complete the electrical circuit. The biasing element 120 acts against the power source to move it back towards the distal end of the body of the light source unit and out of electrical contact with the LED light source, thereby breaking the electrical circuit when either the push button 112 is released or the twist cap 132 is moved in a retrograde direction. The LED light source of the light source unit illuminates the fiber optic fiber bundle 80 when the double-acting switch 110 is in the ON position and the light source unit is received in the bore of the butt grip 74 of the handle section 40.

A closure cap 140 includes internal threads that threadably mate with external threads on the proximal end 66 of handle section 40 to close bore 80 by threadably coupling closure cap 140 to handle section 40.

It is understood that while certain forms of the present invention have been illustrated and described herein, it is not to be limited to the specific forms or arrangements of parts described and shown.

We claim:

1. An illuminated fishing rod comprising:
    a) a hollow blade section having
        (1) a tip at a distal end,
        (2) a plurality of line guides mounted on said blade section,
        (3) a butt section at a proximal end of said blade section,
        (4) a butt guide on the butt section of said blade section,
        (5) a bore extending through said blade section from the proximal end of said blade section to the tip of said blade section, and (6) a chuck on the proximal end of said blade section, the chuck including an internal bore aligned with the bore extending through said blade section;

b) a handle section having
- (1) a foregrip on a distal end of said handle section, the foregrip engaging the chuck on said blade section to couple said handle section to said blade section and including a bore defined therein to be aligned with the bore in the chuck,
- (2) a reel seat section adjacent to a proximal end of the foregrip, the reel seat section having a bore defined therethrough which is aligned with the bore in the foregrip,
- (3) a rear hood/reel seat ring on a proximal end of the reel seat section of said handle section which includes
  - (A) an internal bore aligned with the bore extending through said blade section and through the chuck and foregrip whereby a continuous bore is defined between the a tip of said blade section and a proximal end of said handle section,
  - (B) the internal bore of the hood/reel seat ring having an internal surface,
  - (C) the internal surface of the hood/reel seat ring being reflective, and
  - (D) the internal surface of the hood/reel seat ring being curved,
- (4) a lock ring on the rear hood/reel seat ring,
- (5) a butt grip attached to said handle section adjacent to the lock ring with the lock ring being interposed between the butt grip and the reel seat of said handle section,
- (6) the butt grip of said handle section having a distal end located adjacent to the rear hood/reel seat ring of said handle section and a proximal end,
- (7) the butt grip of said handle section being hollow and having a bore defined therethrough from the proximal end of the butt grip to the distal end of the butt grip and which is aligned with the bore defined through said blade section;

c) a fiber optic bundle located in the bore of said blade section and having a proximal end located closely adjacent to the distal end of said handle section and a distal end located closely adjacent to the distal end of said blade section;

d) a light source unit removably received in the bore in the butt grip of said handle section and including
- (1) a hollow body having a proximal end located adjacent to the proximal end of the butt grip of said handle section when said light source unit is received in the bore of the butt grip and a distal end located adjacent to the proximal end of said fiber optic bundle when said light source unit is received in the bore of the butt grip,
- (2) a hollow bore in the body of said light source unit,
- (3) an LED light source on the distal end of the body of said light source unit and positioned closely adjacent to the proximal end of said fiber optic bundle when said light source unit is received in the bore of the butt grip,
- (4) a power source located in the hollow bore in the body of said light source unit,
- (5) a double-acting switch in the body of said light source unit and having
  - (A) an ON position electrically connecting the power source of said light source unit to the LED light source of said light source unit,
  - (B) an OFF position electrically disconnecting the power source of said light source unit from the LED light source of said light source unit,
  - (C) the double-acting switch being movably mounted on the body of said light source unit to move between the ON position and the OFF position and including
    - (i) a push button element on the proximal end of the body of said light source unit and being mounted on the body of said light source unit to move into the body of the light source unit toward the distal end of the body of the light source unit when pushed toward the distal end of the body of the light source unit to move the double-acting switch to the ON position when the push button is pushed toward the distal end of the body of the light source unit,
    - (ii) a biasing element in the body of said light source unit biasing the push button toward the proximal end of the body of said light source unit and outwardly of the bore in the body of said light source unit to bias the double-acting switch of said light source unit toward the OFF position,
    - (iii) a twist switch having a cap which includes internal threads, and external threads located on the proximal end of the body of said light source unit with the internal threads and the external threads threadably engaged with each other to threadably mount the cap of the twist switch on the distal end of the body of said light source unit and moving the double-acting switch of said light source unit into the ON position when the cap of the twist switch is rotated in one direction and moving the doubleacting switch of said light source unit into the OFF position when the cap of the twist switch is rotated in an opposite direction; and e) the LED light source of said light source unit illuminating said fiber optic fiber bundle when the double-acting switch of said light switch unit is in the ON position and the light source unit is received in the bore of the butt grip of said handle section.

2. The illuminated fishing rod as described in claim 1 wherein the power source of said light source unit includes a battery.

3. The illuminated fishing rod as described in claim 1 further including a cap on the proximal end of the butt grip of said handle section and covering the bore in the butt grip of said handle section when in place on the butt grip of said handle section.

* * * * *